(12) United States Patent
Liu (10) Patent No.: US 11,714,295 B2
(45) Date of Patent: Aug. 1, 2023

(54) IMAGING CORRECTION UNIT AND IMAGING MODULE

(71) Applicant: GUANGZHOU LUXVISIONS INNOVATION TECHNOLOGY LIMITED, Guangzhou (CN)

(72) Inventor: Chuan-Hui Liu, Guangzhou (CN)

(73) Assignee: GUANGZHOU LUXVISIONS INNOVATION TECHNOLOGY LIMITED, Guangzhou (CN)

( * ) Notice: Subject to any disclaimer, the term of this patent is extended or adjusted under 35 U.S.C. 154(b) by 0 days.

(21) Appl. No.: 17/586,690

(22) Filed: Jan. 27, 2022

(65) Prior Publication Data

US 2022/0269101 A1 Aug. 25, 2022

(30) Foreign Application Priority Data

Feb. 22, 2021 (CN) .......................... 202110196349.7

(51) Int. Cl.
*G02B 27/64* (2006.01)
*G02B 26/08* (2006.01)

(52) U.S. Cl.
CPC ....... *G02B 27/646* (2013.01); *G02B 26/0891* (2013.01)

(58) Field of Classification Search
CPC ...................... G03B 2205/0015; G02B 27/646
See application file for complete search history.

(56) References Cited

U.S. PATENT DOCUMENTS

| 621,283 | A | * | 3/1899 | Pulfrich | G02B 23/08 359/422 |
| 7,321,114 | B2 | * | 1/2008 | Lizotte | B23K 26/702 250/234 |
| 8,634,124 | B2 | * | 1/2014 | Yoshikawa | G03B 5/00 359/211.2 |
| 10,571,677 | B2 | * | 2/2020 | Maryfield | F41G 3/326 |
| 2007/0221825 | A1 | * | 9/2007 | Chen | H04N 25/48 348/E3.031 |

FOREIGN PATENT DOCUMENTS

JP 06-250099 A * 9/1994 ............. G03B 23/02

* cited by examiner

*Primary Examiner* — Leon W Rhodes, Jr.
(74) *Attorney, Agent, or Firm* — JCIPRNET (57) ABSTRACT

An imaging correction unit and an imaging module are provided. The imaging correction unit has an optical axis and includes four wedge optical elements with the same structure. The wedge optical elements are disposed sequentially on the optical axis. Each of the wedge optical elements has a minimum thickness dimension at a first edge and a maximum thickness dimension at a second edge. A connection line between the first edge and the second edge forms a symmetry axis of the each of the wedge optical elements. When a beam transmitted along the optical axis of the imaging correction unit passes sequentially through the wedge optical elements and is imaged at a center of an imaging surface, the symmetry axis of any one of the four wedge optical elements is at an angle of 90 degrees relative to the symmetrical axis of one of adjacent wedge optical elements.

16 Claims, 10 Drawing Sheets

IMAGING CORRECTION UNIT AND IMAGING MODULE

CROSS-REFERENCE TO RELATED APPLICATION

This application claims the priority benefit of China application serial no. 202110196349.7, filed on Feb. 22, 2021. The entirety of the above-mentioned patent application is hereby incorporated by reference herein and made a part of this specification.

BACKGROUND

Technical Field

The disclosure relates to an optical unit and an optical module, in particular to an imaging correction unit and an imaging module.

Description of Related Art

Currently, the camera hand-shake correction function is usually an optical method that physically adjusts the optical axis, and the optical hand-shake correction function is typically a lens shift type and a photographing element shift type. Furthermore, the lens shift type hand-shake correction function corrects the optical axis by moving part or all of the lens set used to form the image light of the subject relative to the photographing element in the direction of eliminating hand-shake with a dedicated drive mechanism, and directs the image light of the subject toward the photographing element. However, in this way, the lens shift type hand-shake correction function must be designed each time with a drive mechanism that is appropriate to the shape or optical specifications of the correction lens for each type of lens set constructed by the camera. On the other hand, the hand-shake correction function of the photographing element shift type keeps the position of the photographing element constant with respect to the optical axis of the lens set by using a dedicated drive mechanism to make the photographing element move in response to hand-shake. However, the hand-shake correction function of the photographing element shift type also requires to be designed each time with a drive mechanism according to the different photographing elements of each camera.

Accordingly, there is proposed a structure formed by mounting an optical unit for correction on an optical axis of the optical lens. The optical unit includes a movable prism for refracting light incident to the optical lens, an actuator for driving the movable prism, and a power transfer mechanism including transferring power of the actuator to an axis of the movable prism. This makes it possible to simplify the design by eliminating the need to design the shape of the correction lens and drive mechanism for each type of camera. However, in order to adjust the optical axis in a two-dimensional plane, it is usually necessary to have actuators in different directions for both dimensions. In addition, because the movable prism has a certain thickness, so in the production, the optical unit will have a certain volume, and not easy to integrate into the body of various cameras.

SUMMARY

The disclosure provides an imaging correction unit and an imaging module with the advantages of small size, low power consumption and high performance.

The imaging correction unit of the disclosure has an optical axis and includes four wedge optical elements with a same structure. The four wedge optical elements with the same structure are disposed sequentially on the optical axis. Each of the wedge optical elements has a minimum thickness dimension and a maximum thickness dimension at a first edge and a second edge opposite to each other, respectively. A connection line between the first edge and the second edge forms a symmetry axis of the each of the wedge optical elements. When a beam transmitted along the optical axis of the imaging correction unit passes sequentially through the wedge optical elements and is imaged at a center of an imaging surface, the symmetry axis of any one of the four wedge optical elements is at an angle of 90 degrees relative to the symmetrical axis of one of adjacent wedge optical elements.

According to an embodiment of the disclosure, the imaging correction unit further includes an optical deflecting element. The optical deflecting element has a light incident surface, a reflective optical surface, and a light emitting surface. The reflective optical surface is connected to the light incident surface and the light emitting surface. The light emitting surface of the optical deflecting element faces one of the four wedge optical elements, and the light emitting surface is parallel to the imaging surface.

According to an embodiment of the disclosure, the four wedge optical elements include a first wedge optical element, a second wedge optical element, a third wedge optical element, and a fourth wedge optical element arranged sequentially from an object side to an image side, and the third wedge optical element and the fourth wedge optical element may be rotated relative to the optical axis to correct a traveling direction of the beam passing through the imaging correction unit.

According to an embodiment of the disclosure, the third wedge optical element and the fourth wedge optical element are rotated in opposite directions to each other relative to the optical axis.

According to an embodiment of the disclosure, the third wedge optical element and the fourth wedge optical element are rotated in a same direction relative to the optical axis.

The imaging correction unit of the disclosure has an optical axis and includes an imaging correction element, a third wedge optical element, and a fourth wedge optical element. The imaging correction element has a light emitting surface. The light emitting surface is an oblique plane. An optical behavior of a beam transmitted along the optical axis of the imaging correction element passing through the light emitting surface is equivalent to an optical behavior of passing through an imaginary first wedge optical element and an imaginary second wedge optical element. The imaging correction element, the third wedge optical element, and the fourth wedge optical element are arranged sequentially from an object side to an image side. The first wedge optical element, the second wedge optical element, the third wedge optical element, and the fourth wedge optical element are the same wedge optical elements. The wedge optical element has a minimum thickness dimension and a maximum thickness dimension at a first edge and a second edge opposite to each other, respectively. A connection line between the first edge and the second edge forms a symmetry axis of the wedge optical element. When a beam transmitted along the optical axis of the imaging correction unit passes sequentially through the imaging correction element, the third wedge optical element, and the fourth wedge optical element and is imaged at a center of an imaging surface, a symmetry axis of the third wedge optical element is at an angle of 90 degrees relative to a symmetrical axis of the fourth wedge optical element.

According to an embodiment of the disclosure, the imaging correction element is a triangular prism, and further has a first surface, a second surface, and two side surfaces. The first surface of the imaging correction element is parallel to the optical axis. The second surface is connected to the first surface and the light emitting surface. The two side surfaces are respectively connected to the first surface, the second surface, and the light emitting surface on two sides of the imaging correction element. The light emitting surface faces the imaging surface. The light emitting surface is inclined at a first angle relative to the first surface and inclined at a second angle relative to one of the two side surfaces.

According to an embodiment of the disclosure, the first surface is a light incident surface, the second surface is a reflective optical surface, and a beam incident on the imaging correction element from the light incident surface is reflected by the reflective optical surface and exits the imaging correction element through the light emitting surface.

According to an embodiment of the disclosure, the second surface is a light incident surface, and the beam incident on the imaging correction element from the light incident surface passes through the imaging correction element and exits through the light emitting surface.

According to an embodiment of the disclosure, the third wedge optical element and the fourth wedge optical element may be rotated relative to the optical axis to correct a traveling direction of the beam passing through the imaging correction unit.

According to an embodiment of the disclosure, the third wedge optical element and the fourth wedge optical element are rotated in opposite directions to each other relative to the optical axis.

According to an embodiment of the disclosure, the third wedge optical element and the fourth wedge optical element are rotated in a same direction relative to the optical axis.

The imaging module of the disclosure includes the imaging correction unit and a lens unit. The lens unit is configured to enable a passing beam to be imaged in a predetermined imaging area of the imaging surface.

Based on the above, by configuring the third wedge optical element and the fourth wedge optical element, which may be rotated relative to the optical axis, the imaging correction unit and the imaging module may be controlled by a same actuator to control their relative rotation angles to achieve a function of optical jitter compensation, and thus have the advantages of low power consumption and high performance. In addition, the configuration of the first wedge optical element and the second wedge optical element (or its equivalent imaging correction element) allows the imaging correction unit and the imaging module to coordinate and advance the correction of an initial offset caused by the beam passing through the wedge optical elements, thus enhancing the optical jitter compensation function of the imaging correction unit and the imaging module.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
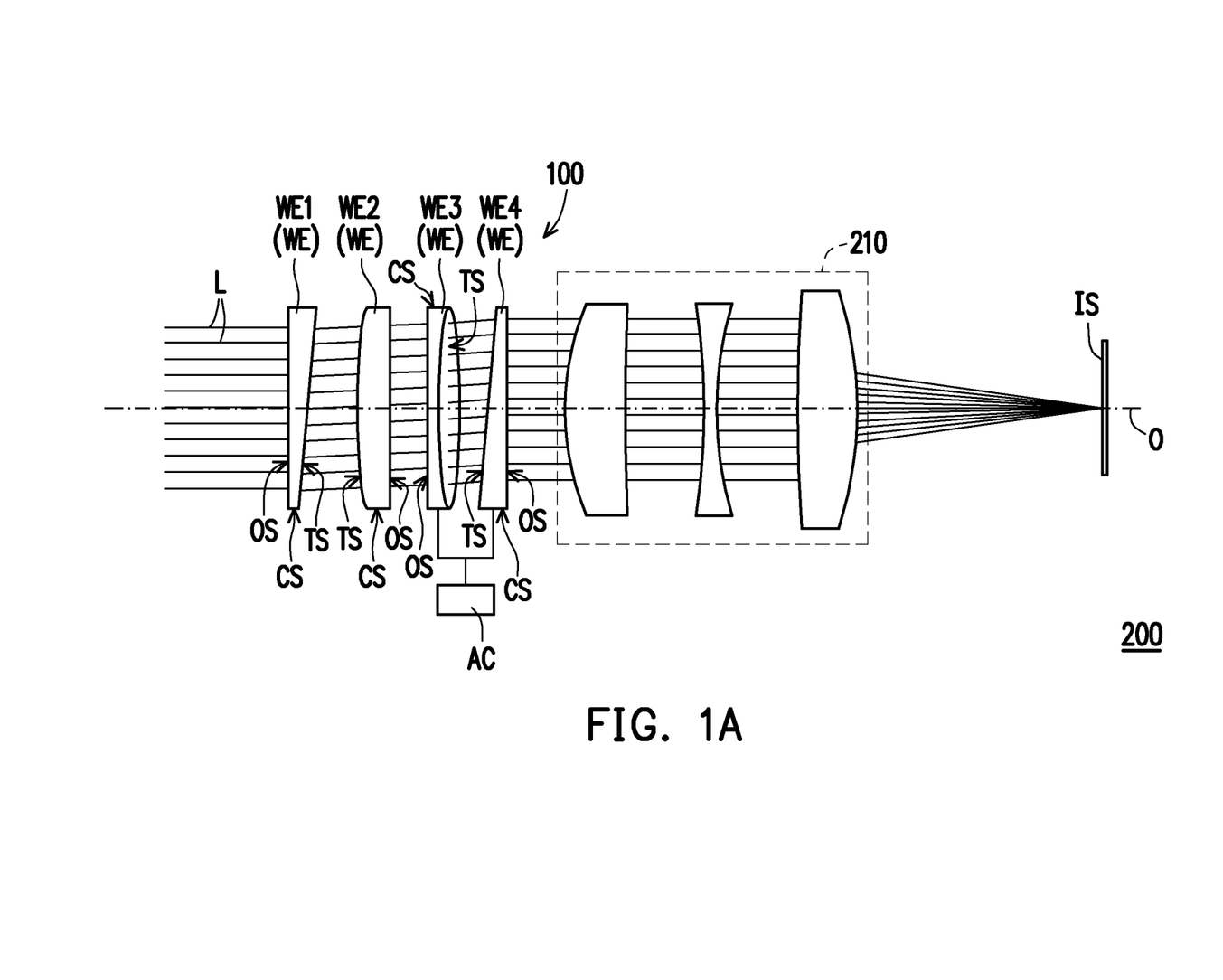
FIG. 1A is a schematic structural diagram of an imaging module according to an embodiment of the disclosure.
Figure 1B:
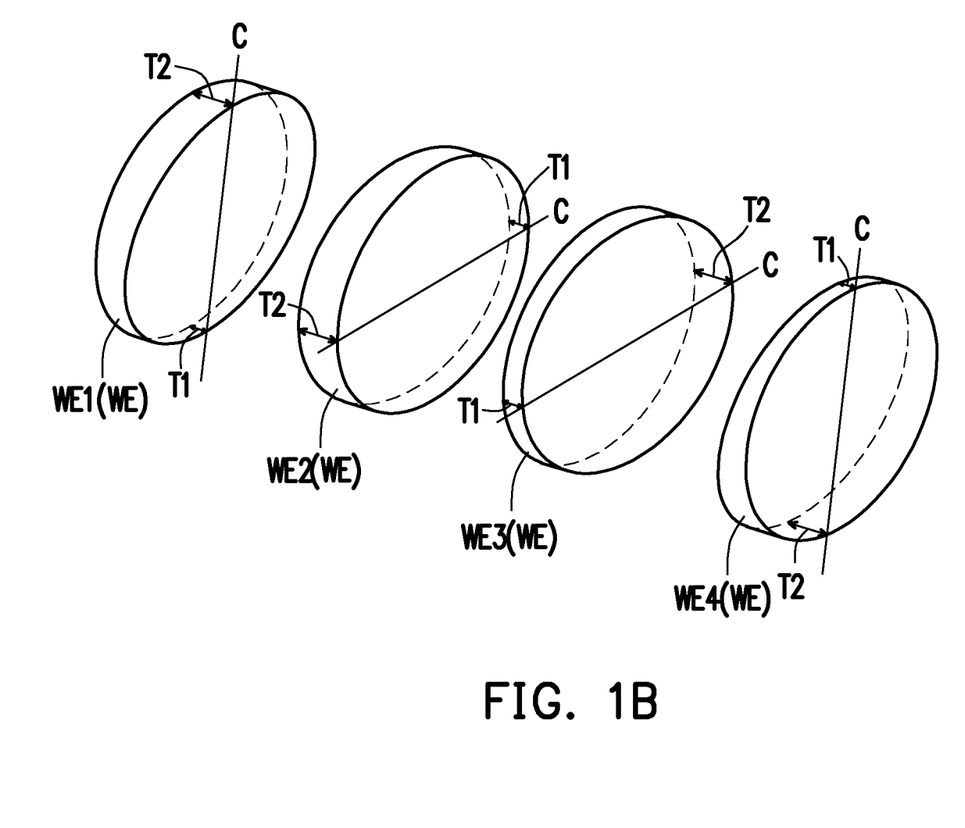
FIG. 1B is a schematic diagram of relative positions of four wedge optical elements with a same structure of FIG. 1A.
Figure 1C:
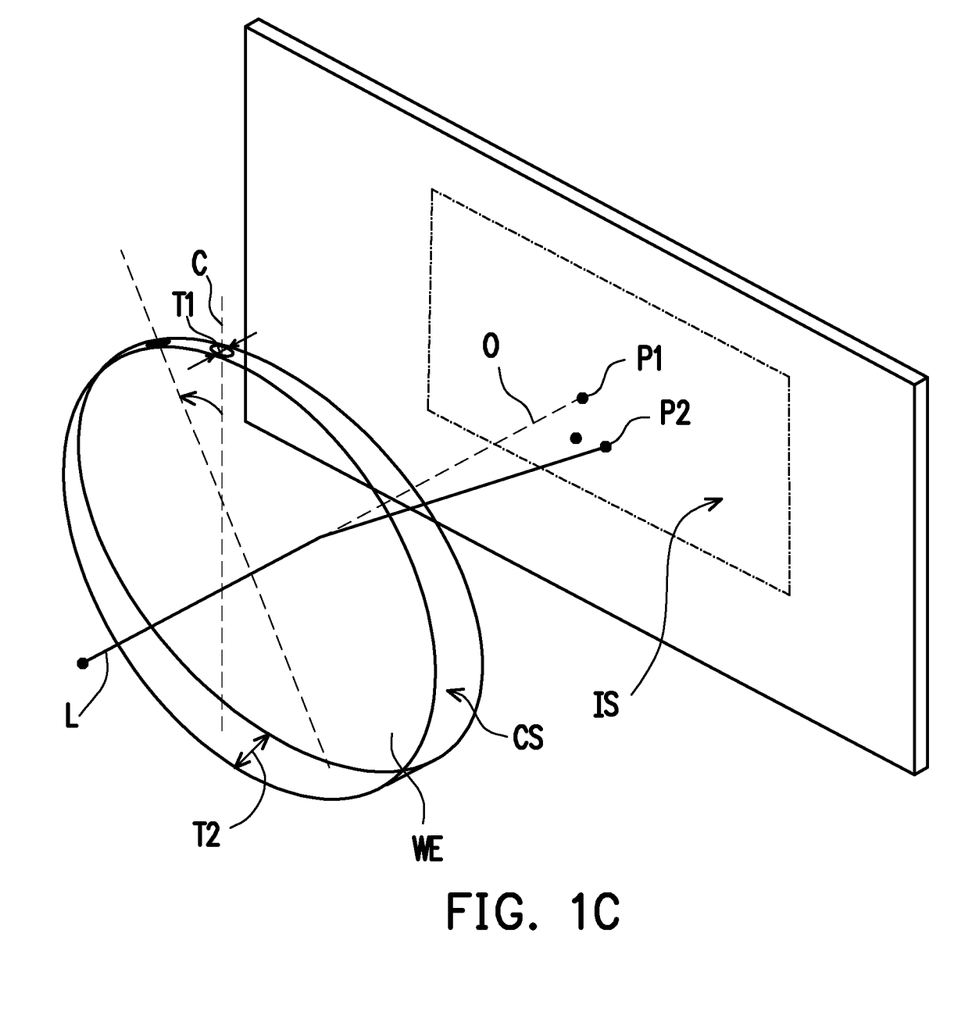
FIG. 1C is a schematic diagram of an optical path when the wedge optical element of FIG. 1A is rotated.
Figure 1D:
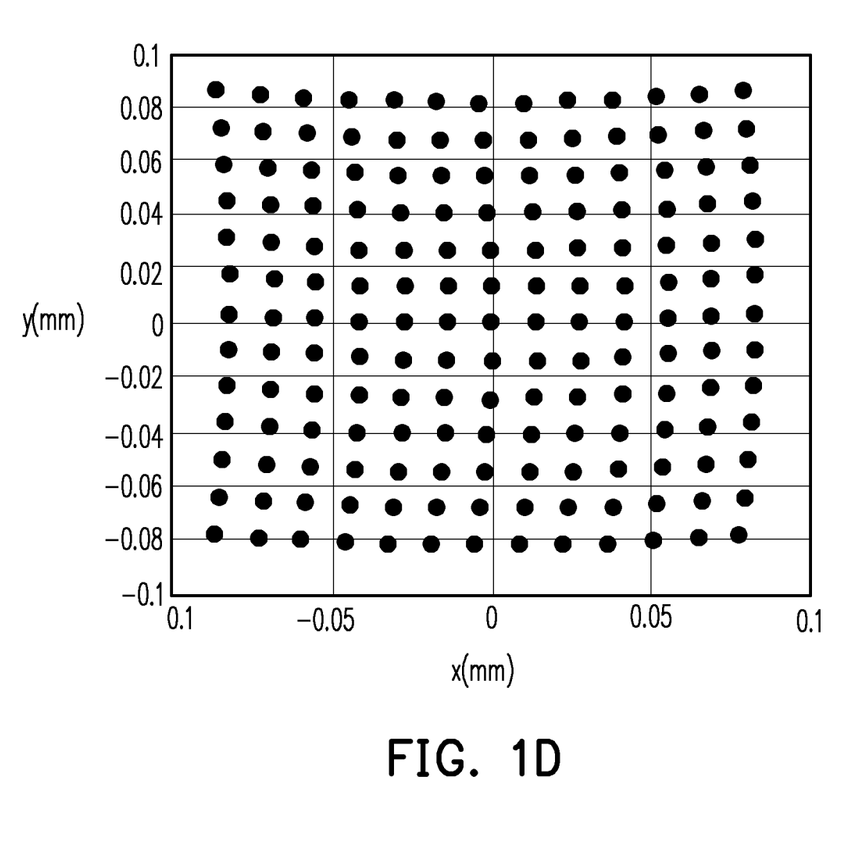
FIG. 1D is a schematic diagram of reference correction positions on an imaging surface of FIG. 1A.

FIG. 1A is a schematic structural diagram of an imaging module according to an embodiment of the disclosure. FIG. 1B is a schematic diagram of relative positions of four wedge optical elements with a same structure of FIG. 1A. FIG. 1C is a schematic diagram of an optical path when the wedge optical element of FIG. 1A is rotated. FIG. 1D is a schematic diagram of reference correction positions on an imaging surface of FIG. 1A. Referring to FIG. 1A, an imaging module 200 according to this embodiment includes an imaging correction unit 100 and a lens unit 210. The imaging correction unit 100 has an optical axis O and includes four wedge optical elements WE with a same structure. The lens unit 210 is configured to enable a beam L passing through the wedge optical element WE to be imaged in a predetermined imaging area of an imaging surface IS. For example, the beam L is an image light forming a subject, and the imaging surface IS is a sensing surface of an image sensing device. For example, the image sensor device may include a charge coupled device (CCD), a complementary metal-oxide semiconductor device (CMOS), or other appropriate types of optical sensor devices. According to this embodiment and some other embodiments, the imaging module 200 further includes an actuator AC. The actuator AC is, for example, but not limited to, a voice coil motor. In detail, the actuator AC may control relative rotation of two of the wedge optical elements WE.

Furthermore, as shown in FIG. 1A and FIG. 1B, the four wedge optical elements WE with the same structure are disposed sequentially on the optical axis O. The four wedge optical elements WE include a first wedge optical element WE1, a second wedge optical element WE2, a third wedge optical element WE3, and a fourth wedge optical element WE4 arranged sequentially from an object side to an image side. As shown in FIG. 1B, each of the wedge optical elements WE has a minimum thickness dimension T1 and a maximum thickness dimension T2 at a first edge and a second edge opposite to each other, respectively. A connection line between the first edge and the second edge forms a symmetry axis C of the each of the wedge optical elements WE, and the thickness dimension of the each of the wedge optical elements WE is gradually changed from the minimum thickness dimension T1 to the maximum thickness dimension T2 along the symmetry axis C of the each of the wedge optical elements WE. Also, as shown in FIG. 1A and FIG. 1C, the each of the wedge optical elements WE has circular contour, and has an inclined optical surface TS, an outer surface OS, and a circumferential end surface CS, with the outer surface OS and the tilted optical surface TS facing each other.

As shown in FIG. 1A and FIG. 1B, when the beam L transmitted along the optical axis O of the imaging correction unit 100 passes sequentially through the wedge optical elements WE and is imaged at a center of the imaging surface IS, the symmetry axis C of any one of the four wedge optical elements WE is at an angle of 90 degrees relative to the symmetrical axis C of one of adjacent wedge optical elements WE. For example, as shown in FIG. 1B, the symmetry axis C of the first wedge optical element WE1 is at an angle of 90 degrees relative to the symmetrical axis C of the second wedge optical element WE2, and the symmetry axis C of the third wedge optical element WE3 is at an angle of 90 degrees relative to the symmetrical axis C of the fourth wedge optical element WE4. In addition, the first wedge optical element WE1 and the fourth wedge optical element WE4 are disposed in rotational symmetry, and the second wedge optical element WE2 and the third wedge optical element WE3 are disposed in rotational symmetry. In this way, the configuration of the first wedge optical element WE1 and the second wedge optical element WE2 allows the imaging correction unit 100 and the imaging module 200 to coordinate and advance the correction of an initial offset caused by the beam L passing through the third wedge optical element WE3 and the fourth wedge optical element WE4, thus enhancing the optical jitter compensation function of the imaging correction unit 100 and the imaging module 200.

Moreover, when the beam L originally intended to be transmitted along the optical axis O of the imaging correction unit 100 deviates from the optical axis O due to optical jitter, the third wedge optical element WE3 and the fourth wedge optical element WE4 may be rotated relative to the optical axis O to correct a traveling direction of the beam L passing through the imaging correction unit 100, thus enabling the imaging correction unit 100 and the lens unit 210 to achieve the function of optical jitter compensation. A correction process using the wedge optical elements WE is further explained in FIG. 1C and FIG. 1D.

As shown in FIG. 1C, when the wedge optical element WE is rotated by an angle relative to the optical axis O, an imaging position of the beam L incident on the imaging surface IS through the wedge optical element WE may be changed and moved from a first position P1 to a second position. Furthermore, according to this embodiment, the rotation of the third wedge optical element WE3 and the fourth wedge optical element WE4 relative to the optical axis O may be controlled by the same actuator AC, and the third wedge optical element WE3 and the fourth wedge optical element WE4 are rotated in opposite directions to each other relative to the optical axis O. For example, as shown in FIG. 1A, the direction of rotation of the third wedge optical element WE3 may be counterclockwise when viewed from a direction of the four wedge optical elements WE to the imaging surface IS, and the direction of rotation of the fourth wedge optical element WE4 is clockwise at this time. In this way, by configuring two wedge optical elements WE, which may be rotated relative to the optical axis O, the imaging correction unit 100 and the imaging module 200 may be controlled by the same actuator AC to control their relative rotation angles to achieve a function of optical jitter compensation, and thus have the advantages of low power consumption and high performance.

Furthermore, as shown in FIG. 1D, the reference correction positions passing through the third wedge optical element WE3 and the fourth wedge optical element WE4 are disposed along coordinate axes of imaging coordinates of the imaging surface IS respectively. When the actuator AC rotates only the third wedge optical element WE3 and not the fourth wedge optical element WE4, the beam L passing through the imaging correction unit 100 may be moved along a horizontal axis of the imaging coordinates of the imaging surface IS. When the actuator AC rotates only the fourth wedge optical element WE4 and not the third wedge optical element WE3, the beam L passing through the imaging correction unit 100 may be moved along a longitudinal axis of the imaging coordinates of the imaging surface IS. In this way, if the imaging position of the beam L, which has deviated from an origin of coordinates of imaging coordinate axes of the imaging surface IS, is now adjusted back to the origin of coordinates, an angle at which the third wedge optical element WE3 and the fourth wedge optical element WE4 should be rotated may be obtained by relevant calculation. Accordingly, an imaging position IP of the beam L, which has deviated from an origin of coordinates of imaging coordinate axes of the imaging surface IS, may be adjusted back to the origin of coordinates of the imaging coordinate axes, and the optical jitter compensation function may be achieved.

Figure 1E:
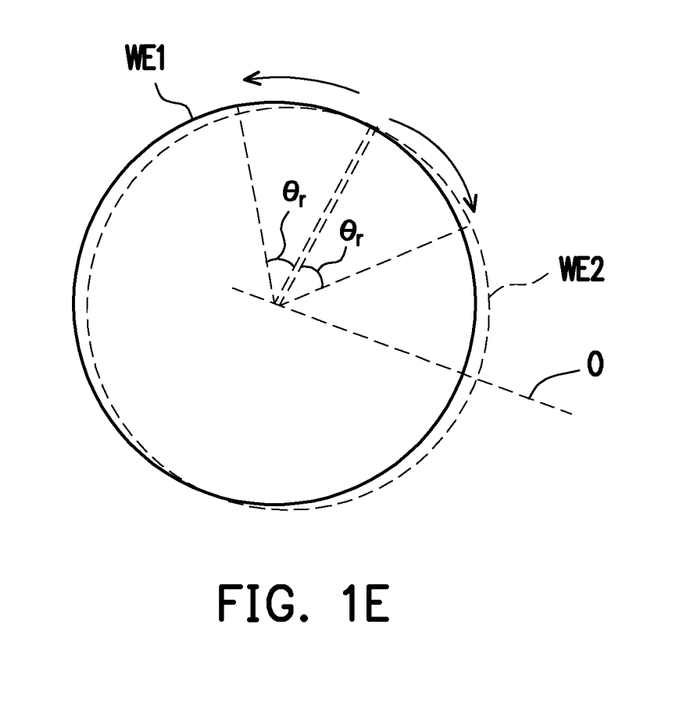
FIG. 1E is a schematic diagram of configuration structure of a third wedge optical element and a fourth wedge optical element according to a comparative example.
Figure 1F:
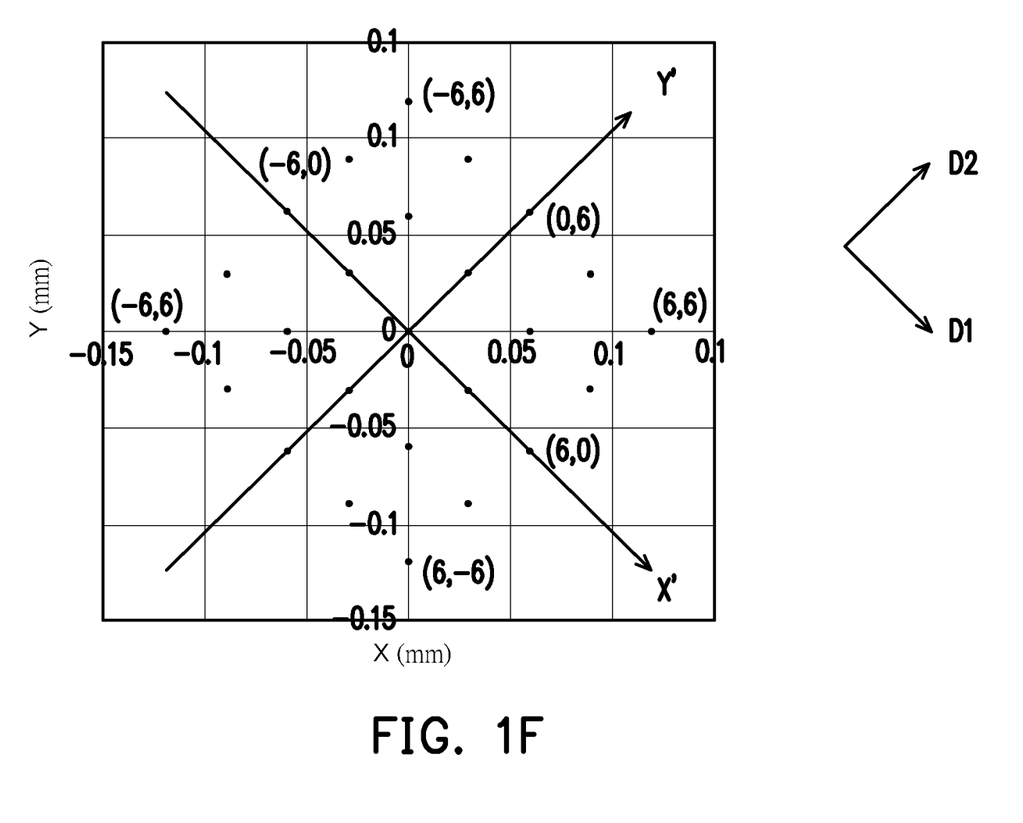
FIG. 1F is a schematic diagram of reference correction positions on an imaging surface of FIG. 1E.

FIG. 1E is a schematic diagram of configuration structure of a third wedge optical element and a fourth wedge optical element according to a comparative example. FIG. 1F is a schematic diagram of reference correction positions on an imaging surface of FIG. 1E. Furthermore, as shown in FIG. 1E and FIG. 1F, when the imaging correction unit 100 lacks configuration of the first wedge optical element WE1 and the second wedge optical element WE2, in order to allow the imaging correction unit 100 and the imaging module 200 to cooperate and advance the correction of the initial offset caused by the beam passing through the third wedge optical element WE3 and the fourth wedge optical element WE4, the third wedge optical element WE3 and the fourth wedge optical element WE4 shall be disposed as shown in FIG. 1E. After centers of the third wedge optical element WE3 and the fourth wedge optical element WE4 and the corresponding first edge (or the second edge) are aligned, the third wedge optical element WE3 and the fourth wedge optical element WE4 are rotated by an angle $\theta_r$ with their center as the origin for initial use. In this way, by matching relative angles of an optical deflecting element 110, the third wedge optical element WE3, and the fourth wedge optical element WE4, the imaging correction unit 100 and the imaging module 200 may also coordinate and advance the correction of the initial offset caused by the beam L passing through the wedge optical elements WE, thus enhancing the optical jitter compensation function of the imaging correction unit 100 and the imaging module 200.

However, due to the lack of the configuration of the first wedge optical element WE1 and the second wedge optical element WE2, the reference correction positions passing through the third wedge optical element WE3 and the fourth wedge optical element WE4 are disposed along a first direction D1 and a second direction D2, respectively, as shown in FIG. 1F, so that the first direction D1 and a second direction D2 may be regarded as being able to form two dimensions of a reference coordinate axis, and the two dimensions of the reference coordinate axis correspond to a value of the angle $\theta_r$. Furthermore, when the actuator AC rotates only the third wedge optical element WE3 and not the fourth wedge optical element WE4, the beam L passing through the imaging correction unit 100 may be moved along a first reference axis X' of the reference coordinate axis, and when the actuator AC rotates only the fourth wedge optical element WE4 and not the third wedge optical element WE3, the beam L passing through the imaging correction unit 100 may be moved along a second reference axis Y' of the reference coordinate axis.

As can be seen from the above, in the imaging correction unit 100 and the imaging module 200 according to this embodiment, through the configuration of the first wedge optical element WE1 and the second wedge optical element WE2, a correction movement process of the beam L passing through the imaging correction unit 100 using the third wedge optical element WE3 and the fourth element WE4 may be moved along the horizontal axis and the longitudinal axis of the imaging coordinates of the imaging surface IS respectively. In the absence of the first wedge optical element WE1 and the second wedge optical element WE2, the correction movement process of the beam L passing through the imaging correction unit 100 using the third wedge optical element WE3 and the fourth element WE4 is moved respectively along another reference coordinate axis that is inclined relative to the imaging coordinate axes. Moreover, comparing FIG. 1D with FIG. 1F, a correction area formed by moving the beam L along the horizontal axis and the longitudinal axis of the imaging coordinated of the imaging surface IS is larger than a correction area formed by moving the beam L along another reference coordinate axis that is inclined relative to the imaging coordinate axes. Therefore, through the configuration of the first wedge optical element WE1 and the second wedge optical element WE2, the imaging correction unit 100 and the imaging module 200 according to this embodiment have a large correction area, which facilitates the optical jitter compensation function.

In addition, according to the foregoing embodiment, the directions of rotation of the third wedge optical element WE3 and the fourth wedge optical element WE4 relative to the optical axis are shown as opposite to each other, but according to another embodiment, the direction of rotation of the third wedge optical element WE3 and the fourth wedge optical element WE4 relative to the optical axis may also be the same, as long as the relative angles of the third wedge optical element WE3 and the fourth wedge optical element WE4 may be matched appropriately to carry out the optical jitter compensation function.

Figure 2:
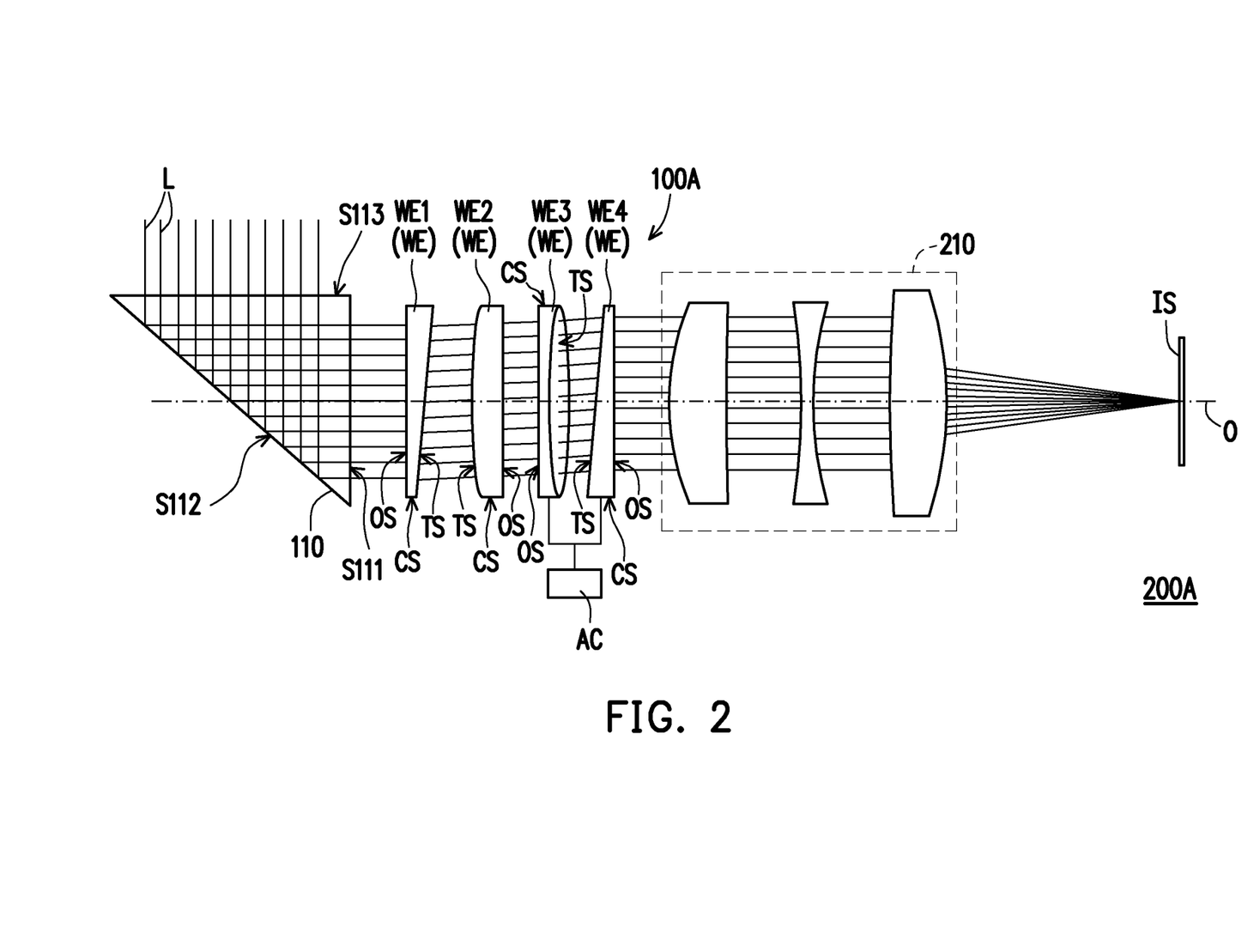
FIG. 2 is a schematic structural diagram of an imaging module according to another embodiment of the disclosure.

FIG. 2 is a schematic structural diagram of an imaging module according to another embodiment of the disclosure. Referring to FIG. 2, an imaging module 200A according to this embodiment is similar to the imaging module 200 of FIG. 1A, with the difference described below. The imaging correction unit 100A according to this embodiment further includes an optical deflecting element 110, and the optical deflecting element 110 is, for example, a triangular prism. The optical deflecting element 110 has a light incident surface S113, a reflective optical surface S112, and a light emitting surface S111. The reflective optical surface S112 is connected to the light incident surface S113 and the light emitting surface S111. The light emitting surface S111 of the optical deflecting element 110 faces one of the four wedge optical elements WE, and the light emitting surface S111 is parallel to the imaging surface IS. In addition, the light incident surface S113 of the optical deflecting element 110 is parallel to the optical axis O, and the light beam L incident on the optical deflecting element 110 from the light incident surface S113 is reflected by the reflective optical surface S112 and exits the optical deflecting element 110 through the light emitting surface S111. In this way, through the configuration of the optical deflecting element 110, the imaging correction unit 100A and the imaging module 200A of the disclosure may change the traveling direction of the image light formed by the subject, and optical elements therein may be disposed compactly, thus having the advantage of small size.

Furthermore, the imaging module 200A and the imaging correction unit 100A may also be configured with the first wedge optical element WE1, the second wedge optical element WE2, the third wedge optical element WE3 and the fourth wedge optical element WE4 to achieve the advantages mentioned above for the imaging module 200 and the imaging correction unit 100, and therefore will not be repeated in the following.

Figure 3A:
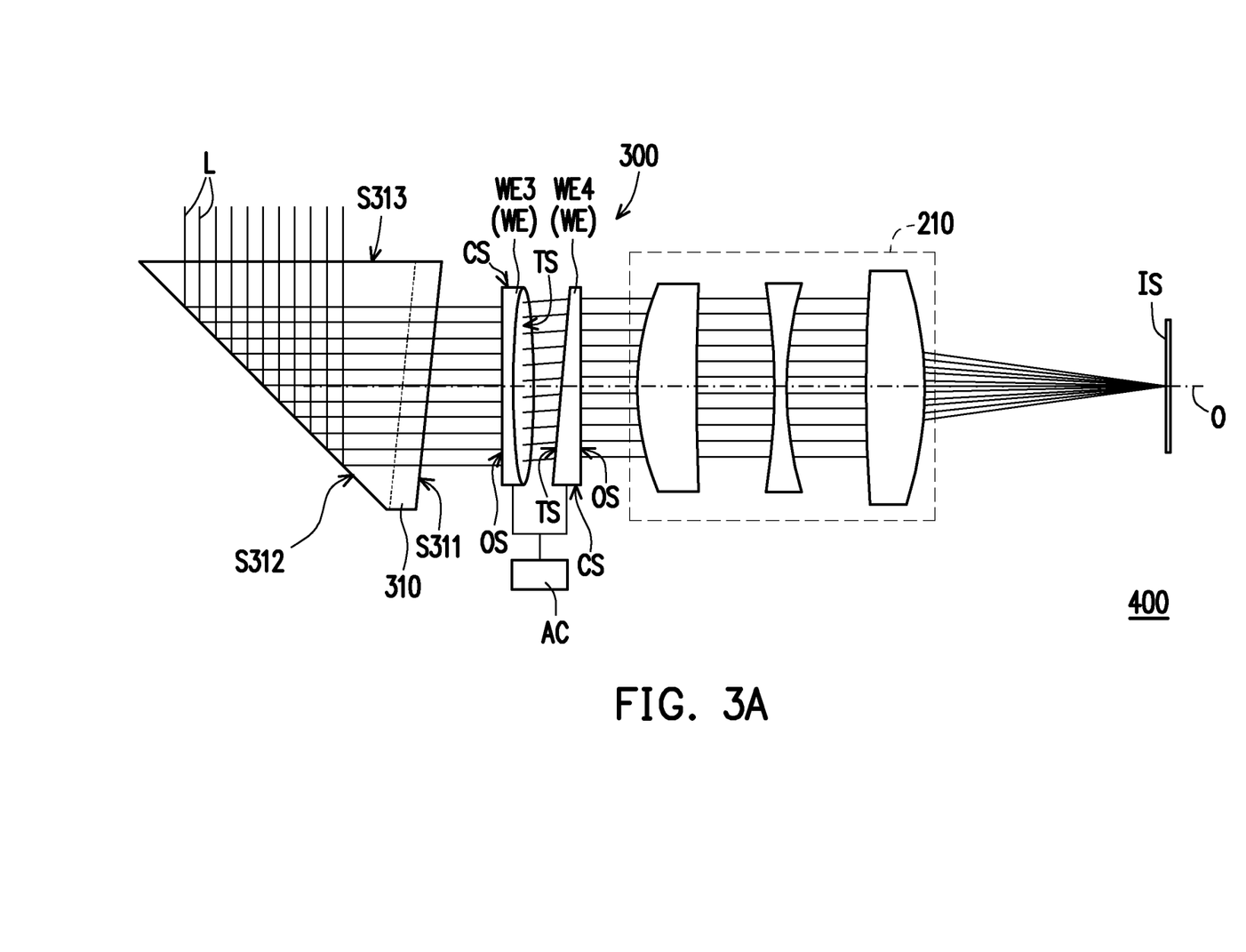
FIG. 3A is a schematic structural diagram of an imaging module according to yet another embodiment of the disclosure.
Figure 3B:
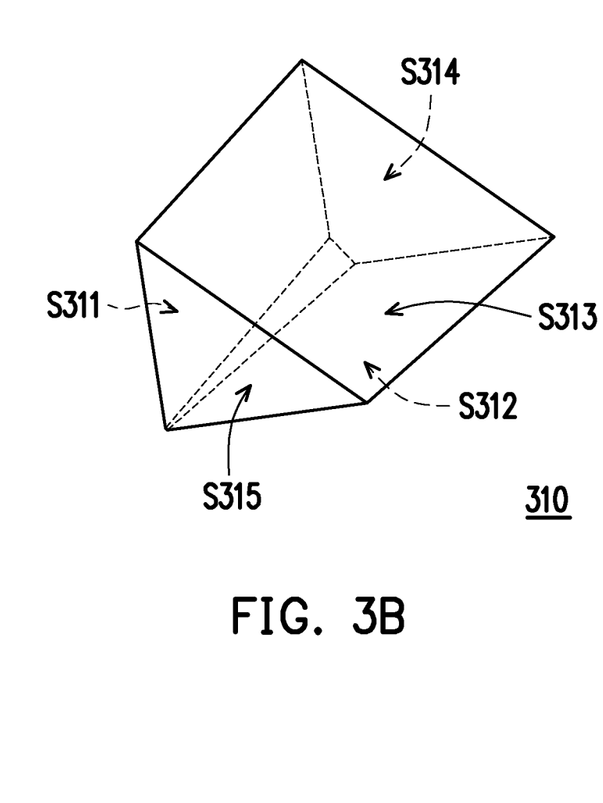
FIG. 3B is a schematic structural diagram of an imaging correction unit of FIG. 3A.

FIG. 3A is a schematic structural diagram of an imaging module according to yet another embodiment of the disclosure. FIG. 3B is a schematic structural diagram of an imaging correction unit of FIG. 3A. Referring to FIG. 3A and FIG. 3B, an imaging module 400 according to this embodiment is similar to the imaging module 200A of FIG. 2, with the difference described below. As shown in FIG. 3A and FIG. 3B, an imaging correction unit 300 has an imaging correction element 310. The imaging correction element 310, the third wedge optical element WE3, and the fourth wedge optical element WE4 are arranged sequentially from the object side to the image side.

More specifically, the imaging correction element 310 is a triangular prism, and has a light emitting surface S311, a first surface S313, a second surface S312, and two side surfaces S314 and S315. The first surface S313 of the imaging correction element 310 is parallel to the optical axis O. The second surface S312 is connected to the first surface S313 and the light emitting surface S311. The two side surfaces S314 and S315 are respectively connected to the first surface S313, the second surface S312, and the light emitting surface S311 on two sides of the imaging correction element 310.

The light emitting surface S311 faces the imaging surface IS, and the light emitting surface S311 is an oblique plane. Here, the oblique plane is defined as a plane that is neither parallel nor perpendicular to any of three principal projection planes, meaning that the oblique plane is inclined to the three principal projection planes. Furthermore, as shown in FIG. 3A and FIG. 3B, the light emitting surface S311 is inclined at a first angle relative to the first surface S313, and is inclined at a second angle relative to one of the two side surfaces S314 and S315. In addition, an optical behavior of the beam L transmitted along the optical axis O of the imaging correction element 310 passing through the light emitting surface S311 of the imaging correction element 310 is equivalent to an optical behavior of passing through an imaginary first wedge optical element WE1 and an imaginary second wedge optical element WE2. In this way, since the optical behavior of the beam L transmitted along the optical axis O of the imaging correction element 310 passing through the light emitting surface S311 is equivalent to the optical behavior of passing through the imaginary first wedge optical element WE1 and the imaginary second wedge optical element WE2, the imaging correction unit 300 and the imaging module 400 may also be configured with the imaging correction element 310 to coordinate and advance the correction of the initial offset caused by the beam L passing through the third wedge optical element WE3 and the fourth wedge optical element WE4, and have a large correction area to enhance the optical jitter compensation function of the imaging correction unit 300 and the imaging module 400.

On the other hand, the first surface S313 of the imaging correction element 310 is a light incident surface, the second surface S312 is a reflective optical surface, and the beam L incident on the imaging correction element 310 from the first surface S313 (the light incident surface) is reflected by the second surface S312 (the reflective optical surface) and exits the imaging correction element 310 through the light emitting surface S311. In this way, through the configuration of the imaging correction element 310, the imaging correction unit 300 and the imaging module 400 of the disclosure may change the traveling direction of the image light formed by the subject, and optical elements therein may be disposed compactly, thus having the advantage of small size.

As can be seen from the above, the imaging correction unit 300 and the imaging module 400 may be configured with the imaging correction element 310, the third wedge optical element WE3, and the fourth wedge optical element WE4 to achieve the advantages mentioned above for the imaging module 200 and the imaging correction unit 100A, and therefore will not be repeated in the following.

Figure 4:
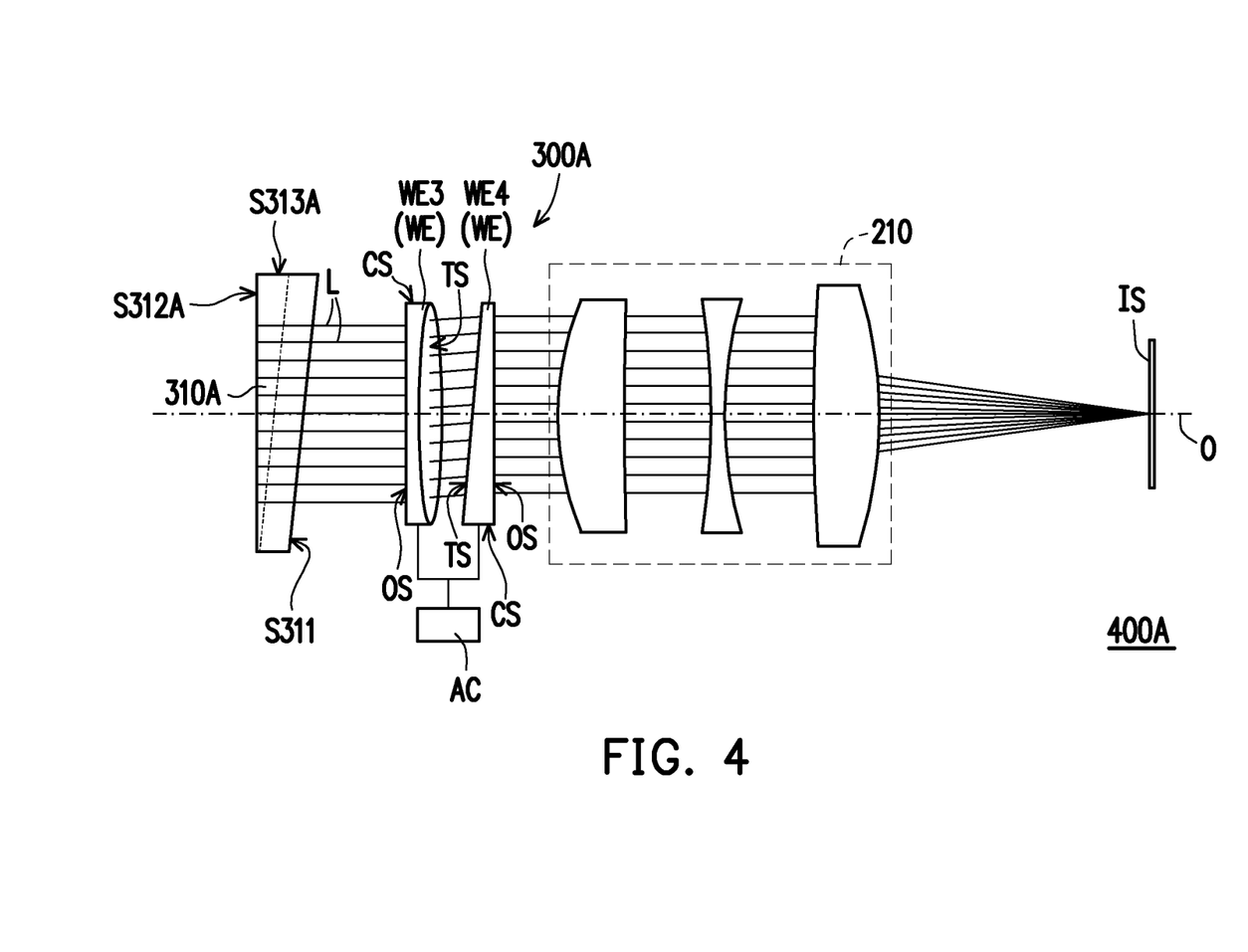
FIG. 4 is a schematic structural diagram of an imaging module of a further embodiment of the disclosure.

FIG. 4 is a schematic structural diagram of an imaging module of a further embodiment of the disclosure. Referring to FIG. 4, an imaging correction unit 300A and an imaging module 400A according to this embodiment are similar to the imaging correction unit 300 and imaging module 400 of FIG. 3A, with the differences described below. As shown in FIG. 4, a second surface S312A of an imaging correction element 310A is a light incident surface, and the beam L incident on the imaging correction element 310A from the second surface S312A passes through the imaging correction element 310A and exits through the light emitting surface S311 without passing through a first surface S313A. Moreover, according to this embodiment, since the optical behavior of the beam L transmitted along the optical axis O of the imaging correction element 310 passing through the light emitting surface S311 is equivalent to the optical behavior of passing through the imaginary first wedge optical element WE1 and the imaginary second wedge optical element WE2, the imaging module 400A and the imaging correction unit 300A may also be configured with the imaging correction element 310A to coordinate and advance the correction of the initial offset caused by the beam L passing through the third wedge optical element WE3 and the fourth wedge optical element WE4, and have a large correction area to enhance the optical jitter compensation function of the imaging correction unit 300A and the imaging module 400A, and therefore will not be repeated in the following.

In summary, by configuring the third wedge optical element and the fourth wedge optical element, which may be rotated relative to the optical axis, the imaging correction unit and the imaging module of the disclosure may be controlled by a same actuator to control their relative rotation angles to achieve a function of optical jitter compensation, and thus have the advantages of low power consumption and high performance. In addition, the configuration of the first wedge optical element and the second wedge optical element (or its equivalent imaging correction element) allows the imaging correction unit and the imaging module to coordinate and advance the correction of an initial offset caused by the beam passing through the wedge optical elements, thus enhancing the optical jitter compensation function of the imaging correction unit and the imaging module.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An imaging correction unit having an optical axis, wherein the imaging correction unit comprises:
   four wedge optical elements with a same structure disposed sequentially on the optical axis, wherein each of the wedge optical elements has a minimum thickness dimension and a maximum thickness dimension at a first edge and a second edge opposite to each other, respectively, a connection line between the first edge and the second edge forms a symmetry axis of the each of the wedge optical elements, and when a beam transmitted along the optical axis of the imaging correction unit passes sequentially through the wedge optical elements and is imaged at a center of an imaging surface, the symmetry axis of any one of the four wedge optical elements is at an angle of 90 degrees relative to the symmetrical axis of one of adjacent wedge optical elements,
   wherein the four wedge optical elements comprise a first wedge optical element, a second wedge optical element, a third wedge optical element, and a fourth wedge optical element arranged sequentially from an object side to an image side, and the third wedge optical element and the fourth wedge optical element may be rotated relative to the optical axis to correct a traveling direction of the beam passing through the imaging correction unit,
   wherein the third wedge optical element and the fourth wedge optical element are rotated in a same direction relative to the optical axis.

2. The imaging correction unit according to claim 1, wherein the imaging correction unit further comprises an optical deflecting element, the optical deflecting element has a light incident surface, a reflective optical surface, and a light emitting surface, the reflective optical surface is connected to the light incident surface and the light emitting surface, the light emitting surface of the optical deflecting element faces one of the four wedge optical elements, and the light emitting surface is parallel to the imaging surface.

3. An imaging correction unit having an optical axis, wherein the imaging correction unit comprises:
   an imaging correction element having a light emitting surface, wherein the light emitting surface is an oblique plane, and an optical behavior of a beam transmitted along the optical axis of the imaging correction element passing through the light emitting surface is equivalent to an optical behavior of passing through an imaginary first wedge optical element and an imaginary second wedge optical element; and
   a third wedge optical element and a fourth wedge optical element, wherein the imaging correction element, the third wedge optical element, and the fourth wedge optical element are arranged sequentially from an object side to an image side, the first wedge optical element, the second wedge optical element, the third wedge optical element, and the fourth wedge optical element are the same wedge optical elements, the wedge optical element has a minimum thickness dimension and a maximum thickness dimension at a first edge and a second edge opposite to each other, respectively, a connection line between the first edge and the second edge forms a symmetry axis of the wedge optical element, and when a beam transmitted along the optical axis of the imaging correction unit passes sequentially through the imaging correction element, the third wedge optical element, and the fourth wedge optical element and is imaged at a center of an imaging surface, a symmetry axis of the third wedge optical element is at an angle of 90 degrees relative to a symmetrical axis of the fourth wedge optical element.

4. The imaging correction unit according to claim 3, wherein the imaging correction element is a triangular prism, and further has a first surface, a second surface, and two side surfaces, the first surface of the imaging correction element is parallel to the optical axis, the second surface is connected to the first surface and the light emitting surface, the two side surfaces are respectively connected to the first surface, the second surface, and the light emitting surface on two sides of the imaging correction element, the light emitting surface faces the imaging surface, and the light emitting surface is inclined at a first angle relative to the first surface and inclined at a second angle relative to one of the two side surfaces.

5. The imaging correction unit according to claim 4, wherein the first surface is a light incident surface, the second surface is a reflective optical surface, and a beam incident on the imaging correction element from the light incident surface is reflected by the reflective optical surface and exits the imaging correction element through the light emitting surface.

6. The imaging correction unit according to claim 4, wherein the second surface is a light incident surface, and the beam incident on the imaging correction element from the light incident surface passes through the imaging correction element and exits through the light emitting surface.

7. The imaging correction unit according to claim 3, wherein the third wedge optical element and the fourth wedge optical element may be rotated relative to the optical axis to correct a traveling direction of the beam passing through the imaging correction unit.

8. The imaging correction unit according to claim 7, wherein the third wedge optical element and the fourth wedge optical element are rotated in a same direction relative to the optical axis.

9. An imaging module comprising:
an imaging correction unit having an optical axis, wherein the imaging correction unit comprises:
four wedge optical elements with a same structure disposed sequentially on the optical axis, wherein each of the wedge optical elements has a minimum thickness dimension and a maximum thickness dimension at a first edge and a second edge opposite to each other, respectively, a connection line between the first edge and the second edge forms a symmetry axis of the each of the wedge optical elements, and when a beam transmitted along the optical axis of the imaging correction unit passes sequentially through the wedge optical elements and is imaged at a center of an imaging surface, the symmetry axis of any one of the four wedge optical elements is at an angle of 90 degrees relative to the symmetrical axis of one of adjacent wedge optical elements, wherein the four wedge optical elements comprise a first wedge optical element, a second wedge optical element, a third wedge optical element, and a fourth wedge optical element arranged sequentially from an object side to an image side, and the third wedge optical element and the fourth wedge optical element may be rotated relative to the optical axis to correct a traveling direction of the beam passing through the imaging correction unit, wherein the third wedge optical element and the fourth wedge optical element are rotated in a same direction relative to the optical axis; and
a lens unit configured to enable a passing beam to be imaged in a predetermined imaging area of the imaging surface.

10. The imaging module according to claim 9, wherein the imaging correction unit further comprises an optical deflecting element, the optical deflecting element has a light incident surface, a reflective optical surface, and a light emitting surface, the reflective optical surface is connected to the light incident surface and the light emitting surface, the light emitting surface of the optical deflecting element faces one of the four wedge optical elements, and the light emitting surface is parallel to the imaging surface.

11. An imaging module comprising:
an imaging correction unit having an optical axis, wherein the imaging correction unit comprises:
an imaging correction element having a light emitting surface, wherein the light emitting surface is an oblique plane, and an optical behavior of a beam transmitted along the optical axis of the imaging correction element passing through the light emitting surface is equivalent to an optical behavior of passing through an imaginary first wedge optical element and an imaginary second wedge optical element; and
a third wedge optical element and a fourth wedge optical element, wherein the imaging correction element, the third wedge optical element, and the fourth wedge optical element are arranged sequentially from an object side to an image side, the first wedge optical element, the second wedge optical element, the third wedge optical element, and the fourth wedge optical element are the same wedge optical elements, the wedge optical element has a minimum thickness dimension and a maximum thickness dimension at a first edge and a second edge opposite to each other, respectively, a connection line between the first edge and the second edge forms a symmetry axis of the wedge optical element, and when a beam transmitted along the optical axis of the imaging correction unit passes sequentially through the imaging correction element, the third wedge optical element, and the fourth wedge optical element and is imaged at a center of an imaging surface, a symmetry axis of the third wedge optical element is at an angle of 90 degrees relative to a symmetrical axis of the fourth wedge optical element; and
a lens unit configured to enable a passing beam to be imaged in a predetermined imaging area of the imaging surface.

12. The imaging module according to claim 11, wherein the imaging correction element is a triangular prism, and further has a first surface, a second surface, and two side surfaces, the first surface of the imaging correction element is parallel to the optical axis, the second surface is connected to the first surface and the light emitting surface, the two side surfaces are respectively connected to the first surface, the second surface, and the light emitting surface on two sides of the imaging correction element, the light emitting surface faces the imaging surface, and the light emitting surface is inclined at a first angle relative to the first surface and inclined at a second angle relative to one of the two side surfaces.

13. The imaging module according to claim 12, wherein the first surface is a light incident surface, the second surface is a reflective optical surface, and a beam incident on the imaging correction element from the light incident surface is reflected by the reflective optical surface and exits the imaging correction element through the light emitting surface.

14. The imaging module according to claim 12, wherein the second surface is a light incident surface, and the beam incident on the imaging correction element from the light incident surface passes through the imaging correction element and exits through the light emitting surface.

15. The imaging module according to claim 11, wherein the third wedge optical element and the fourth wedge optical element may be rotated relative to the optical axis to correct a traveling direction of the beam passing through the imaging correction unit.

16. The imaging module according to claim 13, wherein the third wedge optical element and the fourth wedge optical element are rotated in a same direction relative to the optical axis.

\* \* \* \* \*